Patented Dec. 16, 1924.

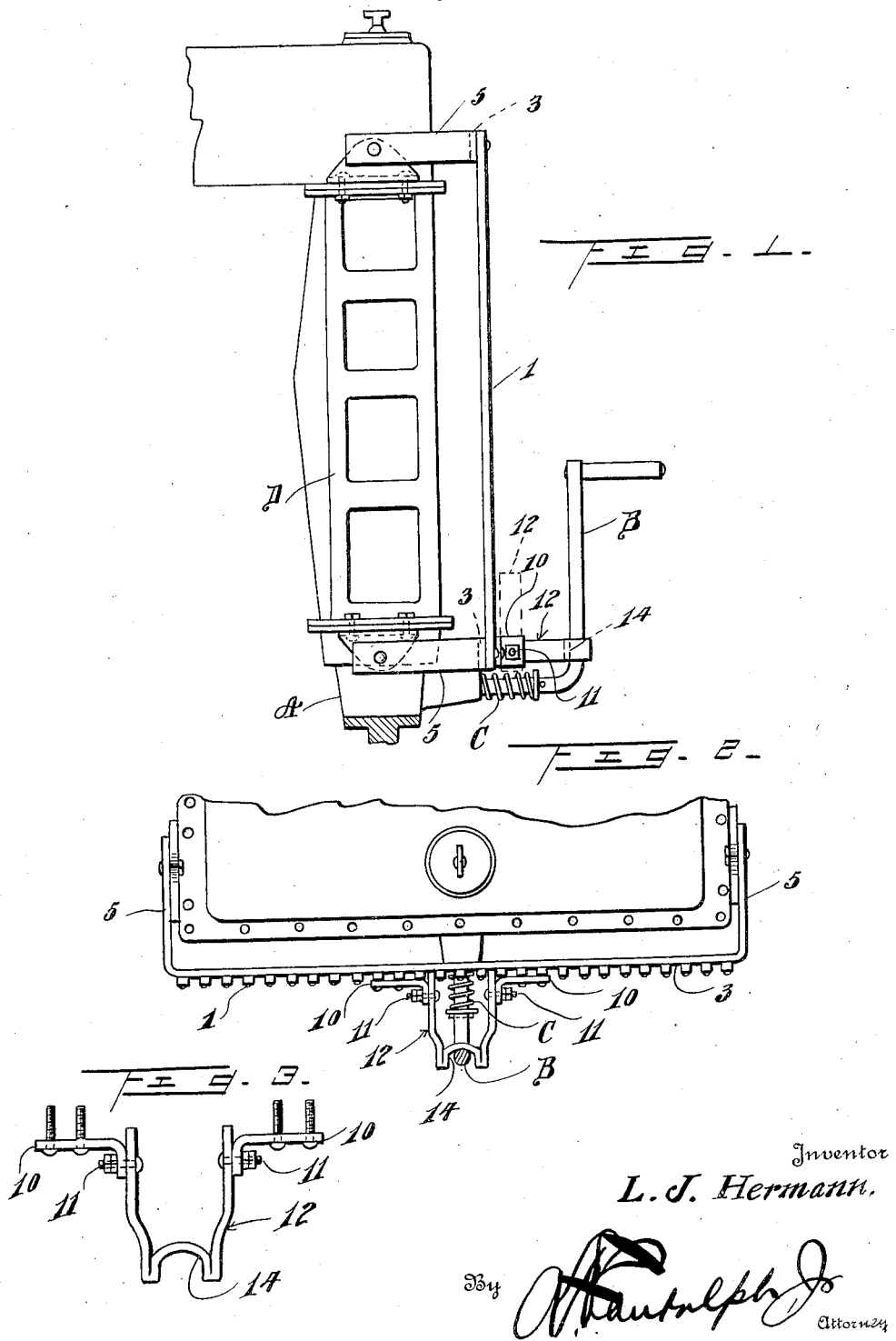

1,519,964

UNITED STATES PATENT OFFICE.

LOUIE J. HERMANN, OF SIGOURNEY, IOWA.

CRANK HOLDER.

Original application filed July 5, 1921, Serial No. 482,510. Divided and this application filed May 4, 1923. Serial No. 636,651.

*To all whom it may concern:*

Be it known that I, LOUIE J. HERMANN, a citizen of the United States, residing at Sigourney, in the county of Keokuk and State of Iowa, have invented certain new and useful Improvements in Crank Holders; and I do hereby declare the following to be a full, clear, and exact description of the invention, such as will enable others skilled in the art to which it appertains to make and use the same.

This invention is a divisional part of the applicaton filed by me July 5, 1921, disclosing a radiator protector and a crank holder for tractors and motor vehicles and which eventuated in Patent No. 1,449,322, on the 20th day of March, 1923, containing claims for the radiator protector.

The present invention is directed to the crank holder which is pivoted and disposed above the crank and provided in its outer end wth a seat to receive the crank and support the same in upright position against rearward movement.

A main object of the invention is the provision of a holder which is pivoted to occupy a vertical position to be out of the way when cranking the engine and a horizontal portion to engage the crank and hold it in upright position so as not to collect trash and prevent rearward movement thereof and engagement with the rapidly rotating engine shaft.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application:

Figure 1 is a side view of the front portion of a tractor illustrative of the invention, the starting crank being held in upright position against rearward movement, the dotted lines indicating the position of the holder when turned upwardly out of the way, Figure 2 is a top plan view of the parts illustrated in Figure 1, and Figure 3 is a plan view of the crank holder and the bracket to which the same is pivoted.

Corresponding and like parts are referred to in the following description and designated in the several views of the drawings by like reference characters.

The letter A designates part of a tractor or other motor vehicle provided with a starting crank B normally held pressed outwardly by means of a helical spring C. The letter D designates the radiator through which the water of the cooling system circulates. These parts may be of any well known construction and arrangement and are illustrated to demonstrate the application of the invention.

The numeral 1 designates a protector for the radiator and embodies spaced vertical bars connected at their upper and lower ends to transverse bars 3 which have their ends 5 bent and secured to the tractor or motor vehicle. This protector is fully disclosed in the application eventuating in the patent herein noted, and of which the present application is a divisional part.

The crank holder 12 may be of any preferred construction and is in the nature of an arm which is pivotally connected to the tractor or motor vehicle A in any convenient and preferred way. The outer or forward end of the arm 12 is provided with a seat or notch 14 which is adapted to receive the crank B, as indicated most clearly in Figure 2. As shown, brackets 10 are bolted or otherwise secured to the lower transverse bar 3 and the crank holder 12 is disposed between the inner or opposing ends of the brackets and pivoted thereto at 11 by means of bolts or other suitable fastening means. It is observed that the holder 12 is located above the shaft portion of the crank, hence is supported thereby in horizontal position when in engagement with the arm of the crank to hold the latter in upright position, as shown most clearly in Figure 1. When it is required to use the crank to start the engine, the holder 12 is turned into upright position, as indicated by the dotted lines in Figure 1, thereby enabling the crank to be pressed inwardly to engage the usual ratchet of the crank shaft whereby the latter may be turned when starting the engine. When the crank is turned into upright position, so as to be out of the way and not collect trash, it is maintained in such position by swinging the holder 12 from upright position into horizontal position. When the crank is held in upright position by engagement of the holder 12 therewith, it is manifest that rearward movement of the crank is prevented, thereby guarding against premature engagement of the starting crank with the engine shaft when the latter is in motion.

What is claimed is:

A crank holder having an arm consisting of a metallic strap generally of U-shape, attaching brackets, bolts pivotally mounting and binding the arm adjacent its distal ends to and against said attaching brackets, the bridge of the strap being reversed to provide a crank-retaining notch, and the strap being doubled at the bridge on each side of the notch.

In testimony whereof I affix my signature in presence of two witnesses.

LOUIE J. HERMANN.

Witnesses:
B. D. HELSCHER,
F. D. SNAKENBERG.